Figure 1:
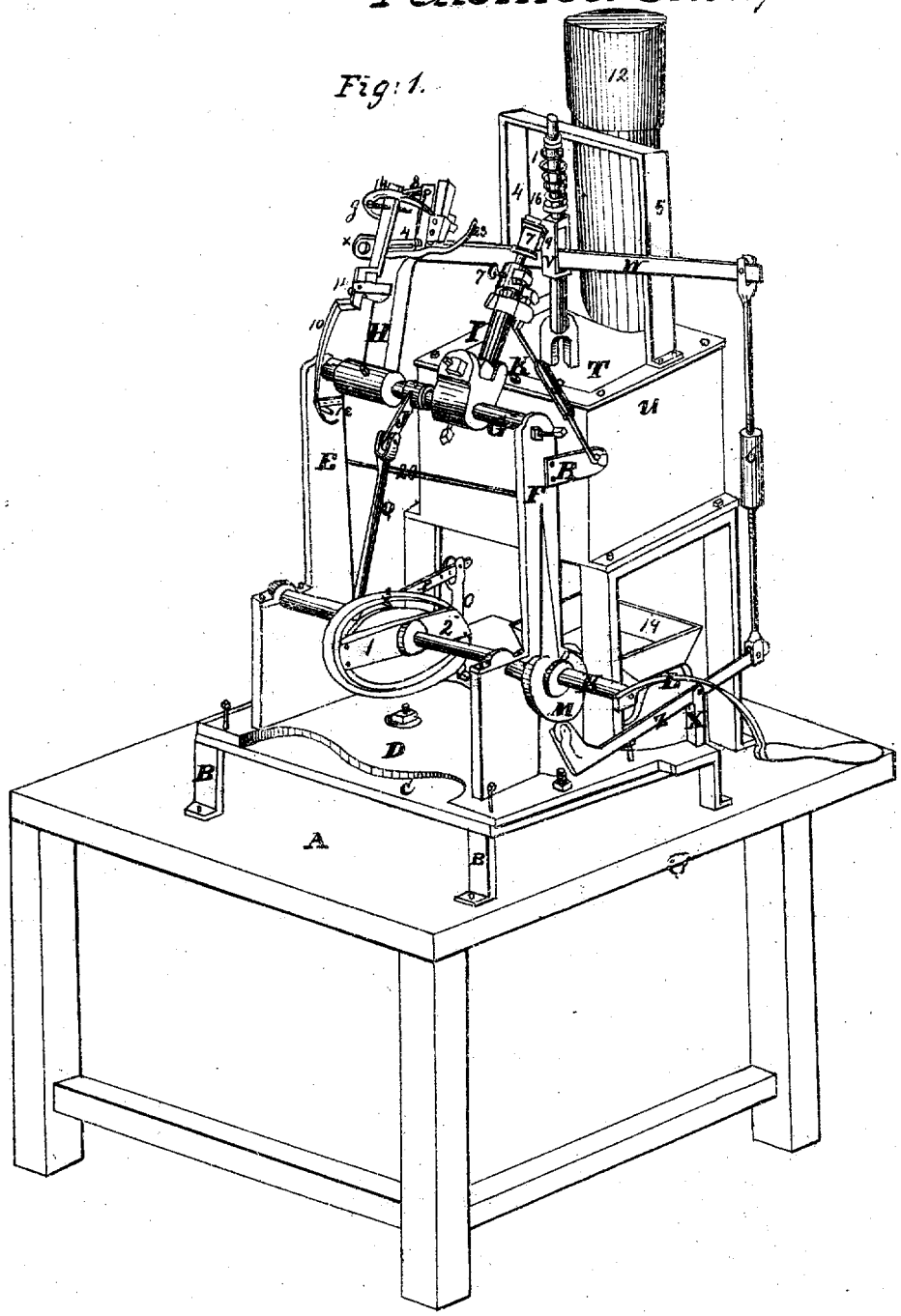
Figure 2:
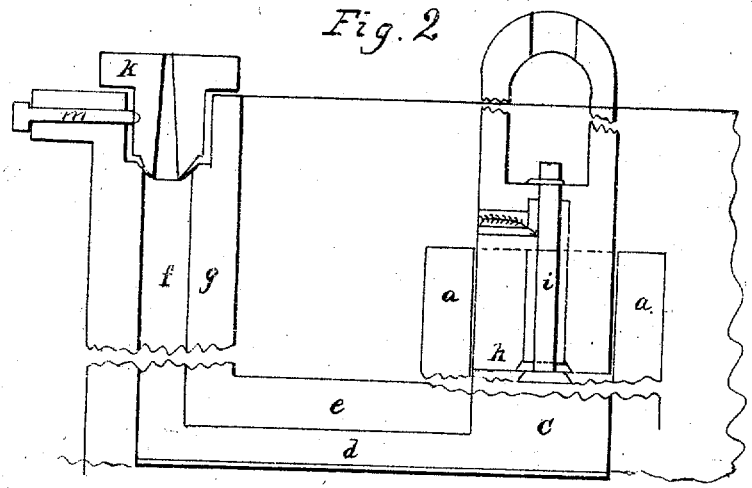
Figure 3:
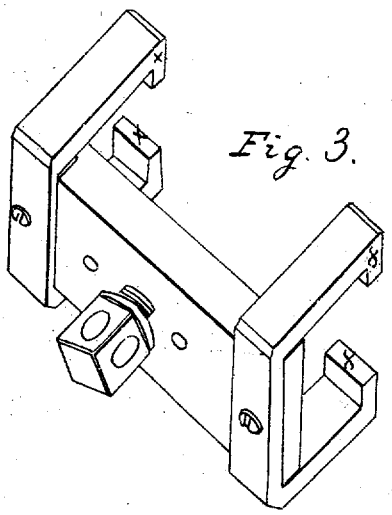
Figure 4:
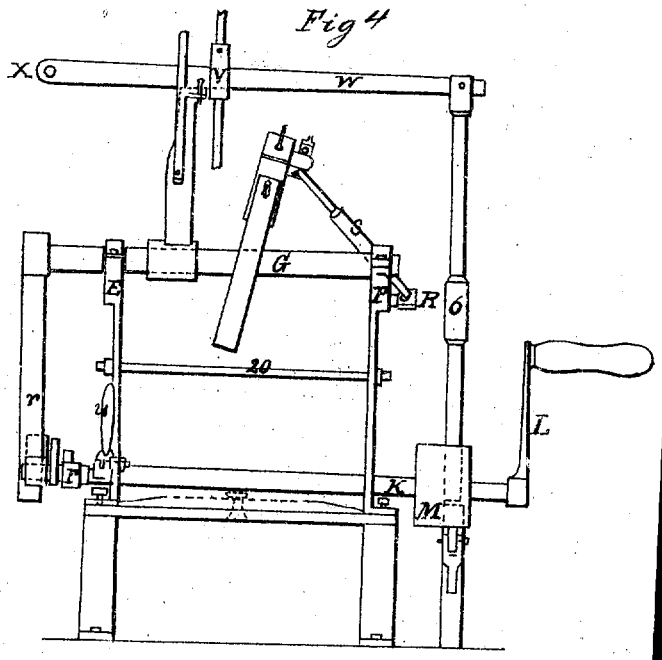
Figure 6:
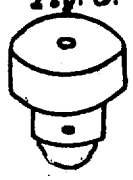
Figure 5:
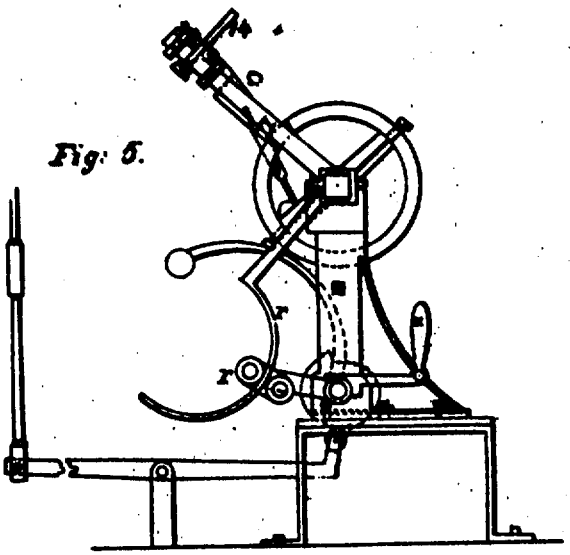
Figure 7:
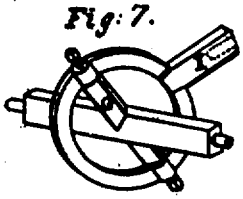
Figure 9:
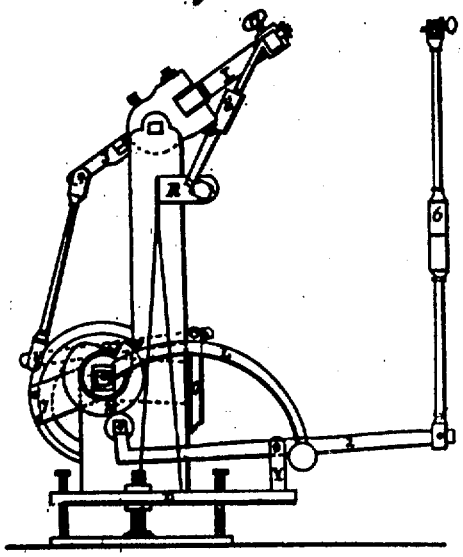
Figure 8:
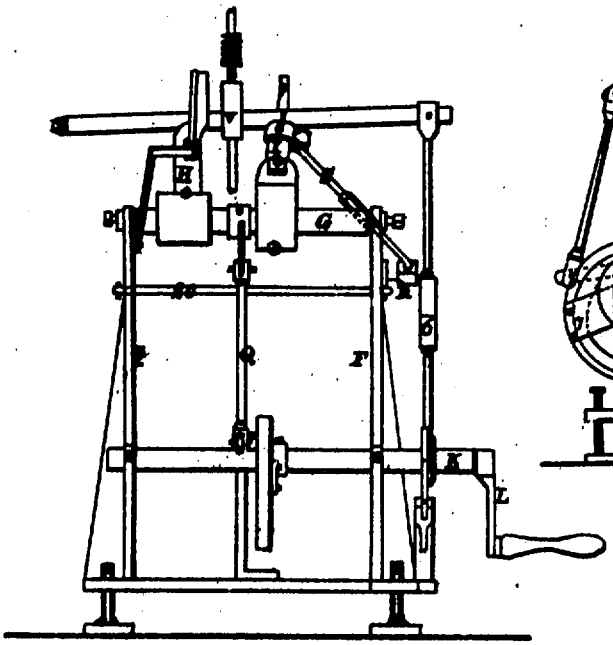

6323X

Sheet 1. 3 Sheets

M. D. Mann & S. Sturdevant.

Type Casting Mach.

No.

Patented Jan. 7. 1831

6323X

Sheet 2. 3 Sheets.

M. D. Mann & S. Sturdevant.
Type Casting Mach.

No.

Patented Jan. 7. 1831.

6323X

Sheet 3. 3 Sheets.

M. D. Mann & S. Sturdevant.
Type Casting Mach.

No.

Patented Jan. 7. 1831.

[illegible] 6323X Jan. 7, 1831

Michael D. Mann & Stephen Sturdevant

Letters Patent Dated January 7th 1831.

---

The Schedule referred to in these Letters Patent, and making part of the same, containing a description in the words of the said Michael D Mann and Stephen Sturdevant, themselves of their improvement in the Machine for casting printing type, called a Vertical Type Caster, which Invention they have assigned to Elihu White of the City of New York, which assignment is recorded in the Patent Office in the Book of Transfers Vol 3 Page 345.

---

To all to whom these presents shall come Be it Known that we Michael D. Mann and Stephen Sturdevant, Machinists, of the City, County and State of New York, have jointly invented, constructed, and applied to use a new and useful Machine, for casting Printing Type, not before known, which we call the Vertical Type Caster.— A description of the construction and manner of using said machine, is correctly set forth, by the accompanying drawings, and specification, in the words following to wit.

(A) In drawing Fig(1.) represents the leaf of a table on which the Machine is planted. (BB) risers, on which a metal bed piece marked (C) is secured. (D) A movable metal platform lying immediately over bed piece (C) resting on the ends of four levelling Screws, and fixed to the bed (C) by nut and bolt in the middle.

(E E) Side posts cast on, or secured to the platform (C). (G) A shaft centered at each end resting and turning on centres, which are fixed in the heads of the posts (E E) On this shaft is secured the fixed arm (H) and the socket joint, which hold on centres, the movable arm (I). Near the middle of said shaft is fixed the

6323X arm (J). Below the shaft (G), rests the shaft (K) fitted to revolve on journals, the boxes of which are formed on the side posts (F & F). To this shaft is attached the crank (L), the small wheel (M), and an elliptical eccentric cam (N), to the two projecting arms of which at 1.2. is secured an elliptical rim of iron, so as to form round cam (N), an elliptical groove, or channel. From the platform (D), rises the stud (O), to which is hung by a joint and pin, one end of the lever (P). A pitman marked (Q) is coupled by a pin and joint, to the other end of said lever, and likewise to the end of arm (J). From the lever (P), projects within the elliptical groove, a pin having on it a friction roller (S), round which travels the aforenamed elliptical rim. On the post (F), is secured a swivel socket, marked (R) through which passes a pin formed on the end of the coupling rod (S). The other end of this rod plays through a fixed socket formed in a projection on the side of arm (I), and is prevented from being drawn out of the socket, by a nut on the end of it. (T) An iron reservoir, or metal kettle, the bottom and sides of which are enclosed by an iron fire place, marked (U), having a grate for the fuel, a door on one side, and a smoke pipe (B), the whole supported on risers, planted on the bed of the table.

(4 & 5), side posts to an iron gallows frame, the feet of which are secured by screws to the rim of the reservoir, the cross piece lying directly over it. In a piece of iron secured on the top of this cross piece, a socket is made, through which passes the upper end of a piston, or pump rod marked (V). Through said rod a mortise is cut at (V) through which passes the lever (W), one end of which is secured by a pin at (X to an arm made on and projecting out from post (4) of the gallows frame. From the platform (D) rises a stud (Y) slitted at the upper end to receive the lever (Z), in which it is secured by a pin. The levers (Z, and W) are coupled together by the rod (4) having a joint and pin at each end of it, at one end of the lever (z), is fitted a friction roller resting against the snail wheel (M). In the end of the arm (I) a socket of about three inches deep, and 3/4 of an inch diameter is bored. (7) A bit of iron about one inch square, at one end of which a shaft of three inches long is turned, and is slid into the beforenamed socket; this piece so fitted we call a slide arm. It is held to its place by the thumb screw (17). For the arm (H) and the slide arm (7) we make and attach a set of clamp hooks, see Fig (m). To each back plate of a common Type Mould we screw a piece of iron, of the length of said plate and of about 3/4 by one inch square, in the upper and under sides of which a groove is formed to receive the hooks, of the clamps (8.8.8.8). By means of those clamps, and the screw (9) one half of the mould in which the type are to be cast, is secured to the arm (H), and the other half to the slide arm (7). (10) A bent lever having its fulcrum at (11), and working over a pin at (12). Its use is to lower or raise one end of the matrix, before discharging the type from the mould. (14). A spring one end of which is to rest on the matrix, and keeps it to its place, when the type is cast. The other end is secured to the arm (H), (15) A spiral spring by which the piston rod is forced downwards. (16) A nut against which the spring rests. This nut works on a screw formed on the piston rod, and by this nut and screw the force of the pump can be regulated.

Fig. II. A section showing the inner formation of our reservoir or metal kettle. In the upright column (a.a) which is cast to, and rises above the bottom of the kettle, the chamber (c) is formed from which the passage (d) leads through the lateral projection (e) also cast on the bottom of said kettle. This passage connects with and has its outlet through the passage (f) formed in the projection (f) cast on the inner side of the kettle; In the chamber (c) is fitted the piston (b) bored through the centr

6323X rod (S). It will also be seen that by the depressing one end of the lever (Z) the piston rod (V) will be lifted, and that a further turn of the snail, will allow the lever (Z) again to rise from the joint of the snail, and the piston to settle down, which it instantly will do, from the action of the spiral spring (15). The fall of the piston will drive a jet of metal up through the spout into the mould: a still further turn of the crank, again depresses lever (Z), and lifts the piston, and also raises the mould from the spout, by means of the lever (E), cam (N) and elliptical ring.

As the mould rises, the rod (S), will cause it to open, and the opening of the mould, will bring the type in contact with a hook or hooks (see 13) placed in one or both of the arms (HI) as may be found expedient, by which it will be discharged from the mould. But we are not alone confined to the before described manner of forming and hanging the swinging arm (I) of our machine. Nor to the before described form of the shaft (G), or mode of giving motion thereto. By making shaft (G), in the form of a cross, and a ring at one end of arm (I), we hang this arm to swing on centres, passing through the ring into the arms of the cross (see Fig VII); and in the place of hanging the shaft (G) on centres as before described, we make it to turn on journals formed at the top of the side posts (F.F.) and passing shaft (K) through said posts directly under shaft (G), see Fig (WVV) we dispense with the cam (N), the elliptic ring, the stud (O), lever (E) and arm (J) before described, and rod (g) placed on the end of shaft (K) the compound swivel crank (P) and between two friction rollers on said crank, we place the curved end of lever (P) the other end being secured to the end of shaft (G) so that by turning the crank (L) and shaft (K) we give the same motion to the shaft (G) and the arms thereto attached as before described. The compound crank (Y) can be shipped or unshipped from the lever (P) by sliding the shaft (K) backwards or forwards in its

6323X sockets, the snail wheel (H) being made wide to prevent the unshipping of [illegible] (L) (N) a dog for holding shaft (K) in its place.

Summary of what we claim and specify as our inventions and improvements in the above described machine, namely, First. The particular construction of the above described kettle, so as to admit of working the metal directly over its rim, and of taking the metal out of the kettle, through a spout rising above said rim. Secondly. The rolling spout and corresponding counter seat by which the face of the spout is adjusted with requisite exactness to the face of the mould, to prevent the escape of metal when ejected into the mould.

Thirdly. The mode of casting by a perpendicular jet of metal, conducted from the metal kettle into the mould, through a spout rising above the rim of the kettle.

Fourthly. The construction and mode of hanging the two arms of the machine, to which the type mould is attached, and the mode of working the type mould, when secured to the ends of said arms.

Fifthly. The application of clamps to a grooved back piece, on the back of the mould, for holding the mould to the arms of the machine as before described.

Sixthly. The mode of opening and closing the mould by means of the rod (S) and the socket (R) as before described.

Seventhly. And we further claim as our invention and improvement, the above described new arrangement and combination of different parts of the whole machine, by which a great improvement is obtained, in casting printers type.

In testimony that the above is a true specification of our said above named invention we have hereunto set our hands this 22d day of December in the year of our Lord One thousand Eight hundred and thirty Witnesses Nathan Lyman William C. Lyman M. D. Mann Stephen Sturdevant

[illegible]

( [illegible] May 3 1841) 2288 [illegible]

Drawing